United States Patent
Willems

(10) Patent No.: US 9,667,119 B2
(45) Date of Patent: May 30, 2017

(54) ROTATIONAL DAMPER

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 547 days.

(21) Appl. No.: 14/221,973

(22) Filed: Mar. 21, 2014

(65) Prior Publication Data
US 2014/0285043 A1    Sep. 25, 2014

(30) Foreign Application Priority Data

Mar. 22, 2013 (DE) .................. 10 2013 004 956

(51) Int. Cl.
| H02K 7/06 | (2006.01) |
| H02K 7/102 | (2006.01) |
| B60G 13/14 | (2006.01) |
| F16F 15/03 | (2006.01) |
| F16F 15/12 | (2006.01) |
| F16F 15/129 | (2006.01) |

(52) U.S. Cl.
CPC ............ H02K 7/102 (2013.01); B60G 13/14 (2013.01); F16F 15/035 (2013.01); F16F 15/1202 (2013.01); F16F 15/129 (2013.01); B60G 2300/60 (2013.01)

(58) Field of Classification Search
CPC .... H02K 7/102; F16F 15/1202; F16F 15/035; B60G 2300/60
USPC ........................................... 310/83
See application file for complete search history.

(56) References Cited

U.S. PATENT DOCUMENTS

| 5,089,734 A * | 2/1992 | Bickraj ............... H02K 16/005 310/115 |
| 9,300,188 B2 * | 3/2016 | Willems ............... B60G 13/14 |
| 2002/0170786 A1 * | 11/2002 | Bucher .................. H02K 7/102 188/185 |
| 2005/0167932 A1 | 8/2005 | Munster |
| 2009/0091093 A1 | 4/2009 | Urababa |
| 2013/0049508 A1 | 2/2013 | Willems |
| 2013/0162066 A1 * | 6/2013 | Stamm ................ H02K 21/38 310/46 |
| 2014/0049094 A1 * | 2/2014 | Cho ....................... H02K 7/006 301/6.5 |

FOREIGN PATENT DOCUMENTS

| DE | 198 46 275 | 12/1999 |
| DE | 101 51 580 | 4/2003 |

(Continued)

*Primary Examiner* — Hanh Nguyen
(74) *Attorney, Agent, or Firm* — Henry M. Feiereisen LLC

(57) ABSTRACT

An electric rotational damper includes a generator which including a stator and a rotor; a damper housing having a housing attachment, wherein the stator is connected with the damper housing, and wherein the housing attachment and the stator in fixed rotative relationship with the damper housing; a transmission connecting a coupling lever with the rotor of the transmission of the rotational damper; a housing part connected with and co-rotating with the transmission, wherein the housing part is in surrounding relationship with the rotor, and wherein the housing attachment is in surrounding relationship with the housing part; and a centrifugal brake arranged between the housing part and the housing attachment.

6 Claims, 2 Drawing Sheets

(56) References Cited

FOREIGN PATENT DOCUMENTS

| | | |
|---|---|---|
| DE | 102004004335 | 8/2005 |
| DE | 102009018889 | 10/2010 |
| DE | 102010013935 | 10/2011 |
| DE | 102011101701 | 11/2012 |
| EP | 1 354 731 | 10/2003 |
| EP | 1 541 394 | 6/2005 |
| EP | 1 785 295 | 5/2007 |
| EP | 1 935 679 | 6/2008 |
| WO | WO 2011/042085 | 4/2011 |

* cited by examiner

ROTATIONAL DAMPER

CROSS-REFERENCES TO RELATED APPLICATIONS

This application claims the priority of German Patent Application, Serial No. 10 2013 004 956.3, filed Mar. 22, 2013, pursuant to 35 U.S.C. 119(a)-(d), the disclosure of which is incorporated herein by reference.

BACKGROUND OF THE INVENTION

The present invention relates to a rotational damper with a housing-fixed stator, a rotor and a transmission, which connects an coupling lever with the rotor of the transmission of the rotational damper.

The following discussion of related art is provided to assist the reader in understanding the advantages of the invention, and is not to be construed as an admission that this related art is prior art to this invention.

WO 2011/042085 A1 relates to an electric damper for damping relative movements between a first and a second mass, including a generator which is driven by the movement of the mass, and which is characterized in that the generator is integrated into a transmission, wherein a first transmission element which forms a stator is caused by the masses to rotate, which causes rotation of a second transmission element which forms a rotor and is coupled with the first transmission element in a directly or indirectly transmitted manner, wherein means for generating a magnetic field are provided either on the first or on the second transmission element. The transmission is a planetary transmission with a ring gear which forms the first transmission element, planetary gears which mesh with the ring gear, and with a sun gear which interacts with the planetary gears.

FIG. 1 of the present specification exemplary shows the course of the damping force of a conventional hydraulic damper, for example according to WO 2011/042085 A1, in traction and compression direction. The moment that can maximally be provided by a generator operated in the generator mode is the tilting moment. This also at the same time limits the maximally provided damping force. Curve x of FIG. 1 shows the course of the damping force of an electric damper. As soon as the tilting moment in the generator is exceeded, the damping force significantly decreases. The generator therefore has to be configured so that the damping forces, which occur during normal operation, are below the tilting moment of the generator. However, for exceptional situations (for example when the vehicle drives over a bump with high speed) the high damping force of a hydraulic damper has to be provided also with an electric damper. Increasing the tilting moment by configuring the generator accordingly inevitably leads to a very large and heavy generator.

Exceptional situations in which the maximal damping forces are required are encountered rather infrequently during operation of the vehicle. It is therefore not useful to dimension the generator in accordance with these maximal forces. Therefore electric dampers were developed in which the generator is merely configured in accordance with the damping forces occurring during normal driving operation. The high damping forces required for exceptional situations are generated by additional means which are activated via centrifugal force and are not activated at damper speeds below the trigger speed.

Thus DE 198 46 275 A1 relates to a system for roll stabilization of vehicles, in particular motor vehicles, in which actuators are provided, which have at least one sensor for detecting a roll parameter and at least one swivel drive which is arranged between halves of the front and/or rear chassis stabilizer, which actuators cause a pre-tensioning of the stabilizer halves for reducing or suppressing the roll movement and in case of rolling generate a counter moment on the vehicle superstructure depending on starting signals of the sensor. The swivel actuator is an electromechanical swivel actuator and means for blocking the pivoting of the stabilizer halves relative to each other are provided. The blocking means have a brake which opens electromagnetically or closes electromagnetically, and which in each swivel actuator is arranged between a respective swivel motor and a reduction gear of the swivel motor.

DE 10 2009 018 889 A1 relates to a roll stabilizer of a motor vehicle with an actuator which is arranged between two stabilizer sections and whose rotor is actuatable for a rotation of the stabilizer sections, wherein a braking device which acts on the rotor is characterized in that the braking device is configured as centrifugal brake which transfers a friction between the rotor and a stator. When the rotor is formed by a motor shaft of an electric motor, radially displaceable centrifugal bodies of the centrifugal brake are connected with the motor shaft. The centrifugal bodies and the stator are configured as friction partners for each other. The stator has a housing which receives the centrifugal bodies. The centrifugal bodies can be displaced radially outwardly against a spring element.

In electric dampers according to the state of the art the centrifugal brake, if provided, is integrated in the damper itself between the rotor and the stator of the generator. Consequently, the forces occurring in an exceptional situation are still introduced into the rotor/stator.

It would therefore be desirable and advantageous to provide an electric damper in which the generator in the exceptional situation is completely bridged.

SUMMARY OF THE INVENTION

According to one aspect of the present invention, an electric rotational damper includes a generator which includes a stator and a rotor; a damper housing having a housing attachment, wherein the stator is connected with the damper housing, and wherein the housing attachment and the stator are in fixed rotative relationship with the damper housing; a coupling lever; a transmission connecting the coupling lever with the rotor of the transmission of the rotational damper; a housing part connected with and co-rotating with the transmission, wherein the housing part is in surrounding relationship with the rotor, and wherein the attachment is in surrounding relationship with the housing part; and a centrifugal brake arranged between the housing part and the housing attachment.

The generator of the electric damper can be configured small, light and efficient without being subjected to the high damping forces occurring in exceptional situations. Further, during an exceptional situation, i.e., when the damping force exceeds the tilting moment of the electric damper, the generator, which is formed by the stator and the rotor, is completely bridged because the force introduction between the damper housing on the superstructure and the housing part which is directly connected with the coupling lever occurs through centrifugal force coupling.

According to another advantageous feature of the invention, the co-rotating housing part can be rotatably supported on the stator by rotary bearings. Because the stator itself is mounted directly on and in rotative fixed relationship with the damper housing, this results in a stable and advantageous support of the co-rotating housing part on the stator.

According to another advantageous feature of the invention the centrifugal brake can include a tension spring which is connected with the housing part and a friction element with a mass m which is impinged by the tension spring, which friction element is moved as a result of the centrifugal force in the direction toward a housing-fixed friction surface on the housing attachment, wherein advantageously the tension spring and the mass of the friction element are dimensioned so that the centrifugal brake is activated when a required damping force exceeds the tilting moment provided by the generator. In this advantageous way, the action of the centrifugal brake can be adjusted to the respective application.

According to another advantageous feature of the invention, the housing attachment can form the friction surface of the centrifugal brake, thereby obviating the requirement for additional parts for providing the friction surface or for individual friction surfaces.

According to another advantageous feature of the invention, the friction element can be fastened on the housing part via a carrier element and a hinge. This advantageously results in a secure arrangement of the centrifugal brake in the electric damper, which requires little constriction effort.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
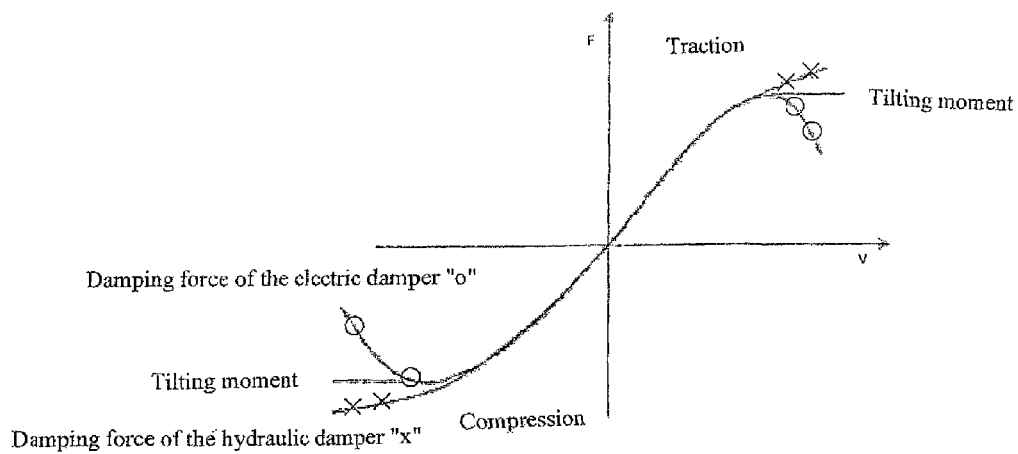
FIG. 1 shows the course of the damping force of a conventional hydraulic damper and of a conventional electric damper in traction and compression direction.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
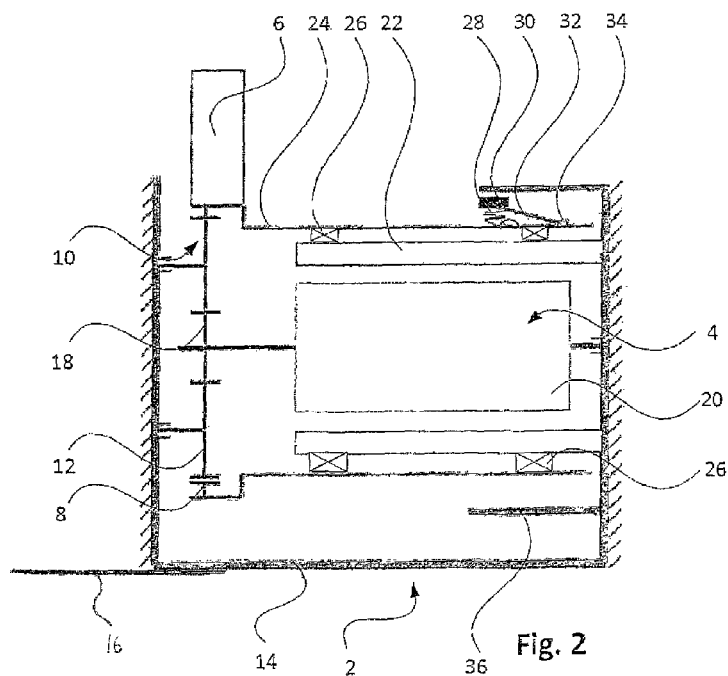
FIG. 2 shows the functional diagram of an electric rotational damper according to an exemplary embodiment of the invention.

Turning now to the drawing, and in particular to FIG. 2, there is shown the functioning diagram of an electric rotational damper 2 with an electric generator 4. A coupling lever 6 of the rotational damper 2 is rigidly connected with a ring gear 8 of a planetary transmission 10 via housing part 24. Planetary gears 12 are connected with a damper housing 14, which in turn is connected with a vehicle superstructure 16. A sun gear 18 of the planetary transmission 10 is directly connected with a rotor 20 of the electric generator 4. A housing-fixed stator 22 of the electric generator 4 is surrounded by a housing part 24, which is connected with the ring gear 8. The co-rotating housing part 24 is rotatably supported on the stator 22 by rotary bearings 26.

Between the co-rotating housing part 24 and the attachment 36 a centrifugal brake is arranged, which in the exemplary embodiment is formed by a friction element 30 and a tension spring 28. The friction element 30 with a mass m is arranged on the housing part 24 via the tension spring 28. The friction element 30 is mounted pivotably on the housing part 24 via the carrier element 32 and the hinge 34. When the housing part 24 rotates sufficiently fast as a result of the activation by the coupling lever 6, the friction element 30 is pushed against the housing-fixed friction surfaces on a housing attachment 36, which is connected with the damper housing 14 in rotative fixed relationship, and the described damping force is generated due to friction. The housing attachment 36 itself forms the friction surface of the centrifugal brake. The trigger speed, i.e., the rotational speed at which the friction element 30 is effectively pushed against the friction surface on the housing attachment 36, can be adjusted via the mass m of the friction element 30 and the spring stiffness of the tension spring 28.

Thus, the tension spring 28 and the mass of the friction element 30 are dimensioned so that the centrifugal brake is activated when the required damping force exceeds the tilting moment provided by the generator 4.

Figure 3:
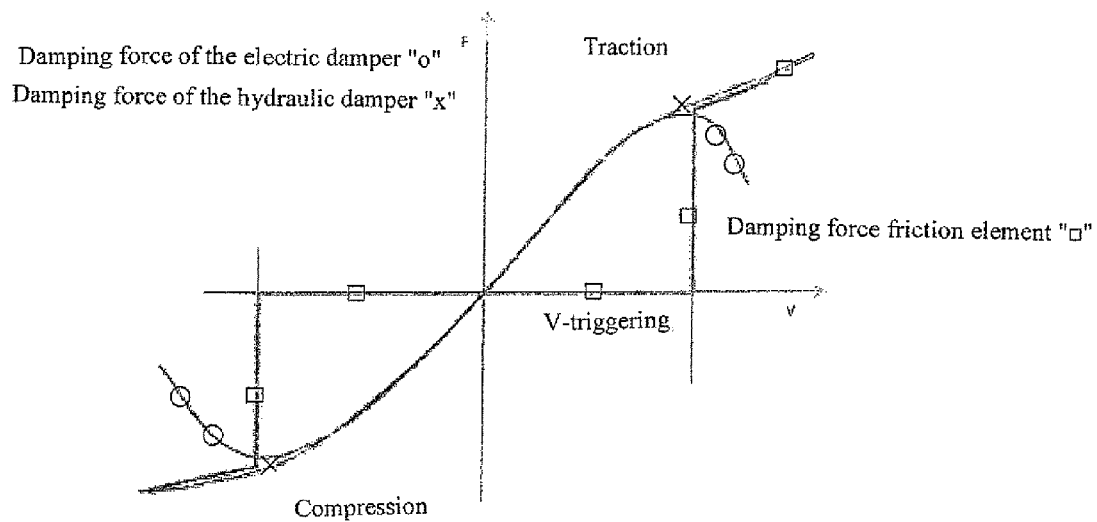
FIG. 3 shows the course of the damping force of a hydraulic damper, an electric damper and a friction element in traction and compression direction.

FIG. 3 shows the course of the damping force of a hydraulic damper, an electric damper and a friction element in traction and compression direction. The course of the damping force by the friction element 30 shows that the centrifugal brake becomes active exactly at the point of the force profile at which the damping force exceeds the tilting moment provided by the generator, so that a sufficient damping force is also available when exceeding the tilting moment.

Figure 4:
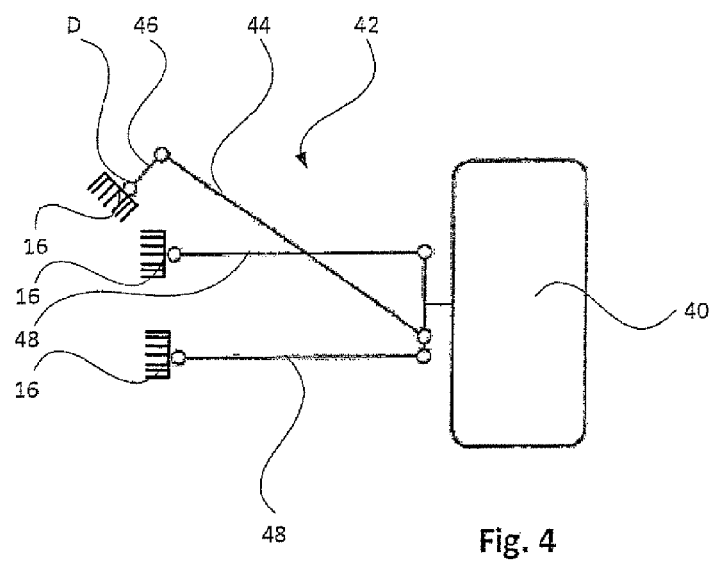
FIG. 4 shows a schematic representation of a wheel suspension with an electric rotational damper according to FIG. 3.

FIG. 4 shows exemplary how the rotational damper 2 can be mounted in an axle with push rod steering. As part of a motor vehicle a wheel 40 with a wheel carrier 42 is shown on which a push rod 44 is arranged which is connected with a lever element 46. The lever element 46 is supported for pivoting about a pivot axis D, wherein the damper 2 is located at the site of the rotation axis D. The damper 2 can also be directly integrated in the rotary suspension of one or both transverse control arms 48. When the wheel 40 springs in or out, the lever element 46 is moved via the push rod 44, so that it rotates about the rotation axis D, whereby the damper 2 is activated and can perform the described damper function.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric rotational damper comprising:
   a generator comprising a stator and a rotor;

a damper housing having a housing attachment, said stator connected with the damper housing, said housing attachment and said stator in fixed rotative relationship with the damper housing;

a coupling lever;

a transmission connecting the coupling lever with the rotor;

a housing part connected with and co-rotating with the transmission, said housing part in surrounding relationship with the rotor, said housing attachment in surrounding relationship with the housing part; and a centrifugal brake arranged between the housing part and the housing attachment.

2. The rotational damper of claim 1, further comprising rotary bearings rotatably supporting the housing part on the stator.

3. The rotational damper of claim 1, wherein the housing attachment has a friction surface, and wherein the centrifugal brake comprises a tension spring and a friction element having a mass, said tension spring being connected with the housing part and impinging on the friction element, said friction element being moved in a direction toward the friction surface in response to a centrifugal force acting on the friction element.

4. The rotational damper of claim 1, wherein the tension spring and the mass of the friction element are dimensioned so that the centrifugal brake is activated when a required damping force exceeds a tilting moment provided by the generator.

5. The rotational damper of claim 1, wherein the housing attachment forms said friction surfaces.

6. The rotational damper of claim 1, further comprising a carrier element and a hinge, said friction element being fastened on the housing part via the carrier element and the hinge.

* * * * *